(12) United States Patent
Liu

(10) Patent No.: US 11,734,483 B2
(45) Date of Patent: Aug. 22, 2023

(54) METHOD OF DRIVING DESIGN ON GATE ELECTRODES, AND DEVICE AND ELECTRONIC DEVICE THEREOF

(71) Applicant: Shenzhen China Star Optoelectronics Semiconductor Display Technology Co., Ltd., Guangdong (CN)

(72) Inventor: Yang Liu, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 480 days.

(21) Appl. No.: 17/048,596

(22) PCT Filed: Aug. 12, 2020

(86) PCT No.: PCT/CN2020/108622
§ 371 (c)(1),
(2) Date: Oct. 18, 2020

(87) PCT Pub. No.: WO2022/007105
PCT Pub. Date: Jan. 13, 2022

(65) Prior Publication Data
US 2023/0103799 A1    Apr. 6, 2023

(30) Foreign Application Priority Data

Jul. 9, 2020 (CN) .......................... 202010657124.2

(51) Int. Cl.
*G06F 30/392* (2020.01)
*G06F 30/31* (2020.01)

(52) U.S. Cl.
CPC ............ *G06F 30/392* (2020.01); *G06F 30/31* (2020.01)

(58) Field of Classification Search
CPC ...................................................... G06F 30/392
USPC ........................................................ 716/119
See application file for complete search history.

(56) References Cited

U.S. PATENT DOCUMENTS

| 9,057,922 B2 | 6/2015 | Su et al. |
| 2016/0225338 A1 | 8/2016 | Lee |
| 2021/0357096 A1* | 11/2021 | Jiang ................... G06F 3/04166 |

FOREIGN PATENT DOCUMENTS

| CN | 104409455 | 3/2015 |
| CN | 105021181 | 11/2015 |
| CN | 106652949 | 5/2017 |
| CN | 109582179 | 4/2019 |

(Continued)

OTHER PUBLICATIONS

Sun "The LCD Technology", Yejing Xianshi Jishu, p. 49-91, 2012. & English Abstract.

(Continued)

*Primary Examiner* — Eric D Lee

(57) ABSTRACT

A method of driving design on gate electrodes includes steps of: determining position information of a gate-on-array (GOA) device in an available drawing space according to a size design information and a resolution design information of a display panel, based on user configuration; determining target GOA design strategy information used for a current gate electrode driving design among a plurality of preset GOA design strategies; and drawing a GOA device pattern in the available drawing space of the GOA device, based on the target GOA design strategy information.

20 Claims, 5 Drawing Sheets

(56) References Cited

FOREIGN PATENT DOCUMENTS

| | | |
|---|---|---|
| CN | 110008616 | 7/2019 |
| CN | 110800039 | 2/2020 |
| KR | 10-1705964 | 2/2017 |

OTHER PUBLICATIONS

Wang et al. "Flat Panel Display Handbook of Doubts Series 2", 108: 1-2, 2021 & English Abstract.

* cited by examiner

| TFT | W | L |
|---|---|---|
| T11 | 3800 | 6 |
| T21 | 6000 | 6 |
| T22 | 500 | 6 |
| T31 | 2500 | 6 |
| T41 | 850 | 6 |
| T51 | 850 | 6 |
| T61 | 1400 | 7 |
| T54 | 650 | 7 |
| T64 | 650 | 7 |
| T52 | 24 | 6 |
| T62 | 100 | 6 |
| T53 | 180 | 6 |
| T63 | 320 | 6 |
| T32 | 24 | 6 |
| T42 | 100 | 6 |
| T33 | 180 | 6 |
| T43 | 320 | 6 |
| T44 | 170 | 7 |

FIG. 4

| TFT | W | L |
|---|---|---|
| T11 | 5000 | 6 |
| T21 | 12000 | 6 |
| T22 | 500 | 6 |
| T31 | 2500 | 6 |
| T41 | 850 | 6 |
| T51 | 850 | 6 |
| T61 | 1400 | 7 |
| T54 | 650 | 7 |
| T64 | 650 | 7 |
| T52 | 24 | 6 |
| T62 | 100 | 6 |
| T53 | 180 | 6 |
| T63 | 320 | 6 |
| T32 | 24 | 6 |
| T42 | 100 | 6 |
| T33 | 180 | 6 |
| T43 | 320 | 6 |
| T44 | 170 | 7 |

METHOD OF DRIVING DESIGN ON GATE ELECTRODES, AND DEVICE AND ELECTRONIC DEVICE THEREOF

RELATED APPLICATIONS

This application is a National Phase of PCT Patent Application No. PCT/CN2020/108622 having International filing date of Aug. 12, 2020, which claims the benefit of priority of Chinese Patent Application No. 202010657124.2 filed on Jul. 9, 2020. The contents of the above applications are all incorporated by reference as if fully set forth herein in their entirety.

FIELD AND BACKGROUND OF THE INVENTION

The present application relates to a display technology field, in particular to a method of driving design on gate electrodes, and a device and an electronic device thereof.

With development of display technology, flat display devices such as liquid crystal display (LCD) devices and organic light-emitting display (OLED) devices have advantages such as high image quality, power saving, thin body, and wide application range, and are widely used in various consumer electronic products such as mobile phones, televisions, personal digital assistants, digital cameras, notebook computers, and desktop computers, becoming a mainstream of display devices.

Technical Problem

Generally, in design processes of display panels, quality of driving design on gate electrodes directly determines electrical and optical performance of the display panels. It is generally evaluated and designed by experienced engineers, and designers are required to have a solid theoretical knowledge of analog circuits, and have deep understanding of principles for driving panels and of design rules for driving display panels, thereby placing high requirements on personnel expertise. Processes such as design circuit construction, signal transmission, and multiple iterations of parameters need to pay attention on many electrical parameters, a period of optimization iteration cycle is long and cumbersome, and zero tolerance of driving circuit design defects is allowed. If there are circuit design defects, display panels will be completely unusable, leading to serious consequences such as redesigning photomasks. Since cost of the photomasks is expensive and will lead to waste of research and development costs and upset rhythm for releasing new display panels, it is not conducive for enterprises to launch new display panels iteratively.

SUMMARY OF THE INVENTION

Embodiments of the present application provide a method of driving design on gate electrodes, and a device and an electronic device thereof, which automatically perform a standard check on design parameters of a display panel in processes of designing the display panel according to design strategies. Design errors are checked and prompted to realize intelligent inspection in the processes of designing the display panel. It avoids manual review and repeated review, reduces workload in stages of designing the display panel, and improves work efficiency of designers.

In order to solve the above-mentioned problems, in a first aspect, the present application provides a method of driving design on gate electrodes, the method comprises:

In some embodiments of the present application, determining, in the preset drawing space, the position information of the GOA device in the available drawing space in the area of the display panel according to the size design information and the resolution design information of the display panel comprises steps of:

determining position information of the area of the display panel and position information of an effective display area of the display panel, based on the size design information of the display panel and the resolution design information of the display panel;

obtaining position information of a border area of the display panel based on user configuration; and determining the position information of the GOA device in the available drawing space in the area of the display panel according to the position information of the border area and the position information of the effective display area.

In some embodiments of the present application, the position information of the effective display area comprises height information and width information of the effective display area, the position information of the border area comprises height information and width information of the border area, the GOA device comprises a plurality of GOA units, and determining the position information of the GOA device in the available drawing space in the area of the display panel according to the position information of the border area and the position information of the effective display area comprises steps of:

determining height information of each of pixels in the effective display area according to the height information of the effective display area;

taking the height information of each of the pixels as height information of the available drawing space of each of the GOA units;

taking the width information of the border area as width information of the available drawing space of each of the GOA units;

determining position information of a rectangular confined by the available drawing space of each of the GOA units according to the height information of the available drawing space of each of the GOA units and the width information of the available drawing space of each of the GOA units; and determining position information of a rectangular confined by the available drawing space of the GOA device in the area of the display panel according to the position information of the available drawing space of the GOA units corresponding to the plurality of the GOA units.

In some embodiments of the present application, the target GOA design strategy information comprises circuit diagram information of the GOA unit and layout information of the plurality of GOA units, and wherein drawing the GOA device pattern in the available drawing space of the GOA device, based on the target GOA design strategy information comprises steps of:

drawing a design pattern of each of the GOA units in the available drawing space of each of the GOA units according to the circuit diagram information of the GOA unit; and drawing an array pattern of the plurality of GOA units according to the layout information of the plurality of GOA units.

In some embodiments of the present application, the plurality of the GOA units have a same circuit structure, the circuit diagram information of the GOA unit is same circuit diagram information for the plurality of GOA units, and drawing the design pattern of each of the GOA units in the available drawing space of each of the GOA units according to the circuit diagram information of the GOA unit comprises steps of:

drawing a shared design pattern for the plurality of GOA units according to the circuit diagram information of the GOA unit; and filling the shared design pattern into the available drawing space of each of the GOA units to implement drawing the design pattern of each of the GOA units.

In some embodiments of the present application, drawing the shared design pattern for the plurality of GOA units according to the circuit diagram information of the GOA unit comprises steps of:

determining information of various circuit design objects in the circuit diagram information of the GOA unit, wherein the circuit design objects comprise electronic components and circuit connection lines;

searching a preset size database of the circuit design objects of the display panel for reference size information of each of the circuit design objects according to the size design information of the display panel;

determining size information of each of the circuit design objects according to the reference size information; and drawing the shared design pattern of the plurality of GOA units according to the size information of each of the circuit design objects.

In some embodiments of the present application, the plurality of GOA units comprise two types of circuit structures, the plurality of GOA units comprise at least one first GOA unit and at least one second GOA unit, the circuit diagram information of the GOA unit comprises a first circuit diagram information corresponding to the first GOA unit and a second circuit diagram information corresponding to the second GOA unit, and drawing the design pattern of each of the GOA units in the available drawing space of each of the GOA units according to the circuit diagram information of the GOA unit comprises steps of:

drawing a first shared design pattern of the first GOA unit according to the first circuit diagram information;

drawing a second shared design pattern of the second GOA unit according to the second circuit diagram information;

filling the first shared design pattern into the available drawing space of each the first GOA unit to implement drawing a design pattern of the first GOA unit; and filling the second shared design pattern into the available drawing space of each the second GOA unit to implement drawing a design pattern of the second GOA unit.

In some embodiments of the present application, drawing the array pattern of the plurality of GOA units according to the layout information of the plurality of GOA units comprises steps of:

drawing clock driving patterns of a target number according to the size design information of the display panel;

aligning first-few GOA units of a target number among the plurality of GOA units with the clock driving patterns of the target number; and drawing a virtual thin-film-transistor (TFT) and a virtual capacitor, and aligning the virtual TFT with a first-staged GOA unit of the plurality of GOA units and aligning the virtual capacitor with a last-staged GOA unit of the plurality of GOA units.

In some embodiments of the present application, drawing the clock driving patterns of the target number according to the size design information of the display panel comprises steps of:

searching a preset size database of the clock driving patterns of the display panel for reference size information of the clock driving patterns according to the size design information of the display panel;

determining size information of each of the clock driving patterns according to the reference size information of the clock driving patterns; and drawing the clock driving patterns of the target number according to the size information of each of the clock driving patterns of the display panel.

In some embodiments of the present application, the plurality of GOA design strategies comprise a plurality of GOA strategies with different numbers of the clock driving signals; and determining the target GOA strategy design information used for the current gate electrode driving design among the plurality of preset GOA design strategies, based on the target clock driving information comprises steps of:

determining the target GOA design strategy information corresponding to the clock driving signals of the target number among the plurality of preset GOA design strategies, according to the clock driving information of the clock driving signals of the target number.

In another aspect, the present application provides a device of driving design on gate electrodes, comprising:

a first obtaining module configured to obtain size design information of a display panel and resolution design information of the display panel based on user configuration;

a position determining module configured to determine, in a preset drawing space, position information of a gate-on-array (GOA) device in an available drawing space in an area of the display panel according to the size design information and the resolution design information of the display panel;

a second obtaining module configured to obtain target clock driving information used for a current gate electrode driving design, wherein the target clock driving information is configured to limit a target number of clock driving signals used in a current GOA device;

a design strategy determining module configured to determine target GOA design strategy information used for the current gate electrode driving design among a plurality of preset GOA design strategies, based on the target clock driving information; and a drawing module configured to draw a GOA device pattern in the available drawing space of the GOA device, based on the target GOA design strategy information.

In some embodiments of the present application, the position determining module is specifically configured to:

determine position information of the area of the display panel and position information of an effective display area of the display panel, based on the size design information of the display panel and the resolution design information of the display panel;

obtain position information of a border area of the display panel based on user configuration; and determine the position information of the GOA device in the available drawing space in the area of the display panel according to the position information of the border area and the position information of the effective display area.

In some embodiments of the present application, position information of the effective display area comprises height information and width information of the effective display area, the position information of the border area comprises height information and width information of the border area, the GOA device comprises a plurality of GOA units, and the position determining module is specifically configured to:

determine height information of each of pixels in the effective display area according to the height information of the effective display area;

take the height information of each of the pixels as height information of the available drawing space of each of the GOA units;

take the width information of the border area as width information of the available drawing space of each of the GOA units;

determine position information of a rectangular confined by the available drawing space of each of the GOA units according to the height information of the available drawing space of each of the GOA units and the width information of the available drawing space of each of the GOA units; and determine position information of a rectangular confined by the available drawing space of the GOA device in the area of the display panel according to the position information of the available drawing space of the GOA units corresponding to the plurality of the GOA units.

In some embodiments of the present application, the target GOA design strategy information comprises circuit diagram information of the GOA unit and layout information of the plurality of GOA units, and the drawing module is specifically configured to:

draw a design pattern of each of the GOA units in the available drawing space of each of the GOA units according to the circuit diagram information of the GOA units; and draw an array pattern of the plurality of GOA units according to the layout information of the plurality of GOA units.

In some embodiments of the present application, the plurality of the GOA units have a same circuit structure, the circuit diagram information of the GOA unit is same circuit diagram information for the plurality of GOA units, and the drawing module is specifically configured to:

draw a shared design pattern for the plurality of GOA units according to the circuit diagram information of the GOA unit; and fill the shared design patterns into the available drawing space of each of the GOA units to implement drawing the design pattern of each of the GOA units.

In some embodiments of the present application, the drawing module is specifically configured to:

determine information of various circuit design objects in the circuit diagram information of the GOA unit, wherein the circuit design objects comprise electronic components and circuit connection lines;

search a preset size database of the circuit design objects of the display panel for reference size information of each the circuit design objects according to the size design information of the display panel;

determine size information of each of the circuit design objects according to the reference size information; and draw the shared design pattern of the plurality of GOA units according to the size information of each of the circuit design objects.

In some embodiments of the present application, the plurality of GOA units comprise two types of circuit structures, the plurality of GOA units comprise at least one first GOA unit and at least one second GOA unit, the circuit diagram information of the GOA unit comprises a first circuit diagram information corresponding to the first GOA unit and a second circuit diagram information corresponding to the second GOA unit, and the drawing module is specifically configured to:

draw a first shared design pattern of the first GOA unit according to the first circuit diagram information;

draw a second shared design pattern of the second GOA unit according to the second circuit diagram information;

fill the first shared design pattern into the available drawing space of each the first GOA unit to implement drawing a design pattern of the first GOA unit; and fill the second shared design pattern into the available drawing space of each the second GOA unit to implement drawing a design pattern of the second GOA unit.

In some embodiments of the present application, the drawing module is specifically configured to:

draw clock driving patterns of a target number according to the size design information of the display panel;

align a target number of first-few GOA units of the plurality of GOA units with the clock driving patterns of the target number; and draw a virtual thin-film-transistor (TFT) and a virtual capacitor, and aligning the virtual TFT with a first-staged GOA unit of the plurality of GOA units and aligning the virtual capacitor with a last-staged GOA unit of the plurality of GOA units.

In some embodiments of the present application, the drawing module is specifically configured to:

search a preset size database of the clock driving patterns of the display panel for reference size information of the clock driving patterns according to the size design information of the display panel;

determine size information of each of the clock driving patterns according to the reference size information of the clock driving patterns; and draw the clock driving patterns of the target number according to the size information of each of the clock driving patterns of the display panel.

In some embodiments of the present application, the plurality of GOA design strategies comprise a plurality of GOA strategies with different numbers of the clock driving signals; and the design strategy determining module specifically configured to:

determine the target GOA design strategy information corresponding to the clock driving signals of the target number among the plurality of preset GOA design strategies, according to the clock driving information of the clock driving signals of the target number.

In another aspect, the present application provides an electronic device, comprising:

one or more processors;

a memory; and one or more application programs, wherein the one or more application programs are stored in the memory and configured to be executed by the processors to implement the method of driving design on gate electrodes.

Beneficial Effect

In stages of driving design on gate electrodes of a display panel, position information of an available drawing space of a gate-on-array (GOA) device and target GOA design strategy information are automatically determined in a preset drawing space based on user configuration information, to realize rapid drawing of GOA device patterns in the available drawing space of the GOA device, reducing dependence on designers' design experience, eliminating a need for designers to manually calculate design parameters, shortening design time and evaluation time for the display panel, quickly producing gate electrode driving designs that meet requirements, improving research and development efficiency, and saving human resources and costs.

BRIEF DESCRIPTION OF THE SEVERAL VIEWS OF THE DRAWINGS

In order to clearly illustrate technical solutions in embodiments of the present application, a brief description of drawings used in the embodiments would be given as below. Obviously, the drawings in the following description are merely some embodiments of the present application. For persons skilled in this art, other drawings can be obtained from these drawings under the premise of no creative efforts made.

FIG. 4 is a table of a thin-film-transistor (TFT) size in a first GOA layout according to an embodiment of the present application.

DESCRIPTION OF SPECIFIC EMBODIMENTS OF THE INVENTION

Figure 1:
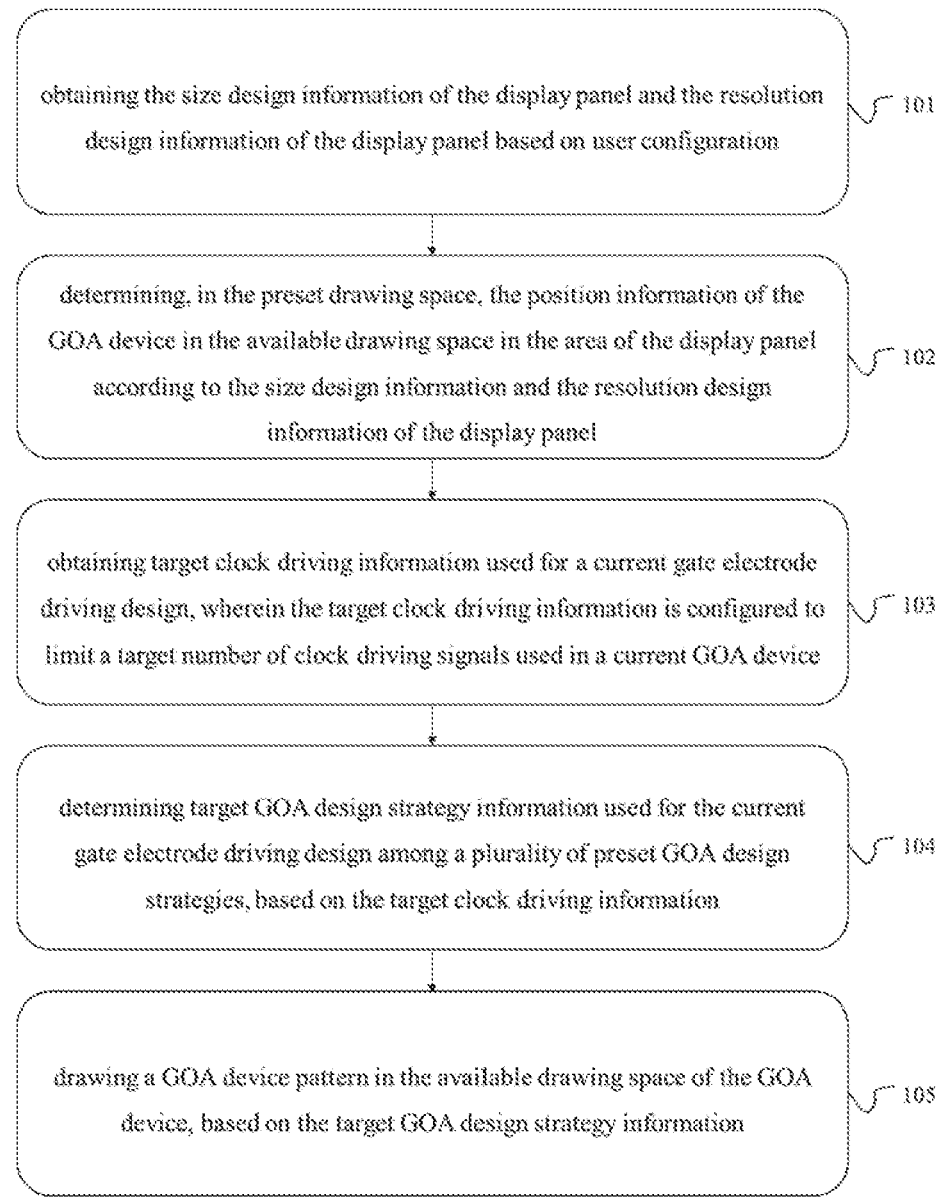
FIG. 1 is a schematic flowchart of a method of driving design on gate electrodes according to an embodiment of the present application.

Technical solutions in embodiments of the present application will be clearly and completely described below in conjunction with drawings in the embodiments of the present application. Obviously, embodiments described are only a portion of the embodiments of the present application, not all of them. Based on the embodiments of the present application, other embodiments obtained under the premise of no creative efforts made by persons skilled in this art are within a protection scope of the present application.

In a description of the present application, it should be understood that directional terms or spatially relative terms such as "central", "longitudinal", "transverse", "length", "width", "thickness", "upper", "lower", "front", "back", "left", "right", "vertical", "horizontal", "top", "bottom", "inner", "outer" are orientations or directions with referring to the accompanying drawings, and are merely for describing the present application and illustrating briefly, which does not indicate or imply that referred equipment or a device must have a specific orientation to construct and operate with a specific orientation. Additionally, terms such as "first", "second" are only used for illustrating objects, and are not to be understood as indicating or implying relative importance or as implicitly including one or more features. In the description of the present application, unless otherwise specifically stated, "multiple" means two or more.

In the present application, a term "exemplary" is used to mean "serving as an example, illustration, or description".

Any embodiment described as "exemplary" in the present application is not necessarily construed as being more preferred or advantageous over other embodiments. In order to enable persons skilled in this art to implement and use the present application, the following description is given. In the following description, details are listed for a purpose of explanation. It should be understood that persons skilled in this art may realize that the present application can also be implemented without using these specific details. In other instances, well-known structures and processes will not be elaborated in detail to avoid unnecessary details from obscuring the description of the application. Therefore, the present application is not intended to be limited to the illustrated embodiments, but is consistent with a broadest scope that conforms to principles and features disclosed in the present application.

An embodiment of the present application provides a method of driving design on gate electrodes, and a device and an electronic device thereof, which will be described in detail below.

First, a method of driving design on gate electrodes in the embodiment of the present application is introduced. The method of driving design on gate electrodes is implemented in an electronic device. The electronic device may be a desktop terminal or a mobile terminal, and the electronic device may also be a mobile phone, a tablet computer, a notebook computer, and the like.

The method of driving design on gate electrodes includes steps of: obtaining size design information of a display panel and resolution design information of the display panel based on user configuration; determining, in a preset drawing space, position information of a gate-on-array (GOA) device in an available drawing space in an area of the display panel according to the size design information and the resolution design information of the display panel; obtaining target clock driving information used for a current gate electrode driving design, wherein the target clock driving information is configured to limit a target number of clock driving signals used in a current GOA device; determining target GOA design strategy information used for the current gate electrode driving design among a plurality of preset GOA design strategies, based on the target clock driving information; and drawing a GOA device pattern in the available drawing space of the GOA device, based on the target GOA design strategy information.

GOA is an abbreviation of gate-on-array. In the present application, the gate electrode driving intelligent design is a design used for the GOA device. GOA technology is that a driving circuit of horizontal scan lines is fabricated on a substrate around a display area (forming the GOA device) by using original manufacturing processes of a display panel, so that external integrated-circuits (ICs) may be replaced for driving the horizontal scan lines. Binding processes of the external ICs can be reduced by the GOA technology, there are opportunities to increase production capacity and reduce display panel costs, and can make liquid crystal display panels more suitable for manufacturing display panels with narrow border or no border.

As shown in FIG. 1, which is a schematic flowchart of the method of driving design on gate electrodes according to an embodiment of the present application, and the method includes steps of:

Step 101: obtaining the size design information of the display panel and the resolution design information of the display panel based on user configuration.

In the embodiment of the present application, when a designer (user) needs to start the gate electrode driving design, the size design information of the need-to-be-designed display panel and the resolution design information of the need-to-be-designed display panel can be configured in advance. Specifically, the user configuration here can be user input. For example, when a user performs a program corresponding to the method of driving design on gate electrodes, an input interface of the size design information of the display panel and the resolution design of the display panel pops up by clicking a preset design menu or pops up automatically. After the user enters relevant parameters, the size design information of the display panel and the resolution design of the display panel configured by the user is obtained.

For example, size design of the display panel corresponding to the current gate electrode driving design is 55' ultra-high definition (UHD), a diagonal length of the effective display area is 138731.517152, and the resolution design of the display panel is 2160*3840.

Step 102: determining, in the preset drawing space, the position information of the GOA device in the available drawing space in the area of the display panel according to the size design information and the resolution design information of the display panel.

In the embodiment of the present application, processes of executing the method of driving design on gate electrodes can be loaded into a design program of the display panel in a way of a plug-in, or it can be loaded into an intelligent design program which is used for driving the gate electrodes and is independent of the design program of the display panel. As long as design parameters of the display panel corresponding to current design operations performed by a user can be collected in a design program of the display panel, the details are not limited here.

Wherein, the design program of the display panel may be an existing program of electronic design automation (EDA) designed in the display panel, such as Protel, Altium Designer, PSPICE, OrCAD, etc.

Wherein, the preset drawing space can be an initial design space of a design program or design plug-in corresponding to the method of driving design on gate electrodes, such as a design space used for intelligently designing gate electrodes in EDA.

Step 103: obtaining target clock driving information used for a current gate electrode driving design.

Wherein, the target clock driving information is used to limit the target number of clock driving signals used in the current GOA device, and the target number of clock driving signals is used to determine the number of GOA driving stages. For example, the target number of clock driving signals is 4, 8, or 12, etc., and which are respectively corresponding to 4CK, 8CK, or 12CK, etc. of the number of GOA driving stages. Specifically, in the embodiment of the present application, a plurality of types of clock driving information can be preset, and a way of obtaining the target clock driving information used for the current gate electrode driving design may be: obtaining the target clock driving information used for the current gate electrode driving design selected by a user among the plurality of types of preset clock driving information. It can be understood that in some other embodiments of the present application, obtaining the target clock driving information used for the current gate electrode driving design can also be automatically determining the target clock driving information used for the current gate electrode driving design, that is, automatically determining the number of GOA driving stages. For example, the number of GOA driving stages (the target number of clock driving signals) can be automatically determined by integrating charging rate, RC loading condition, and Q point charging condition, and the like.

Step 104: determining target GOA design strategy information used for the current gate electrode driving design among a plurality of preset GOA design strategies, based on the target clock driving information.

Generally, it is difficult to have a complete definition for specifications of the display panel, because a feeling of display of the display panel is subjective to consumers. Specifications of the display panel provided by different manufacturers will also be different. However, for designers, it is necessary to transform customer requirements and manufacturer requirements into objective and quantifiable data as a design goal, that is, to transform into designable specifications, that is, design specifications (professional specifications). The preset GOA design strategy of the display panel in the embodiment of the present application is a preset GOA design rule or GOA design specification of the display panel, so that when designers designing, based on GOA design data of the display panel according to user configuration, the GOA device pattern is automatically drawn according to the GOA design strategy.

In the embodiment of the present application, after obtaining the target clock driving information (the number of clock driving signals) in Step 103, the number of GOA driving stages is determined. Based on the target clock driving information, the target GOA design strategy information that meets the number of GOA drive stages (the number of clock driving signals) is determined among the plurality of preset GOA design strategies. The target GOA design strategy information is the GOA design strategy information used for the current gate electrode driving design.

The number of GOA driving stages can be determined and selected according to a demand for charging ability of the display panel. If the demand for charging ability is set as high, a higher number of GOA driving stages can be considered, for example, 12CK driving stages are selected, and vice versa.

Step 105: drawing a GOA device pattern in the available drawing space of the GOA device, based on the target GOA design strategy information.

According to the present application, in stages of driving design on gate electrodes of the display panel, the position information of the available drawing space of the GOA device and the target GOA design strategy information are automatically determined in the preset drawing space based on user configuration information, to realize rapid drawing of GOA device patterns in the available drawing space of the GOA device, reducing dependence on designers' design experience, eliminating a need for designers to manually calculate design parameters, shortening design time and evaluation time for the display panel, quickly producing gate electrode driving designs that meet requirements, improving research and development efficiency, and saving human resources and costs.

It should be noted that the display panels in the embodiment of the present application may be one of various types of display panels, such as liquid crystal display (LCD) panels, organic light-emitting diode (OLED) display panels, specifically, such as thin-film-transistor liquid crystal display (TFT-LCD) panels.

Figure 2:
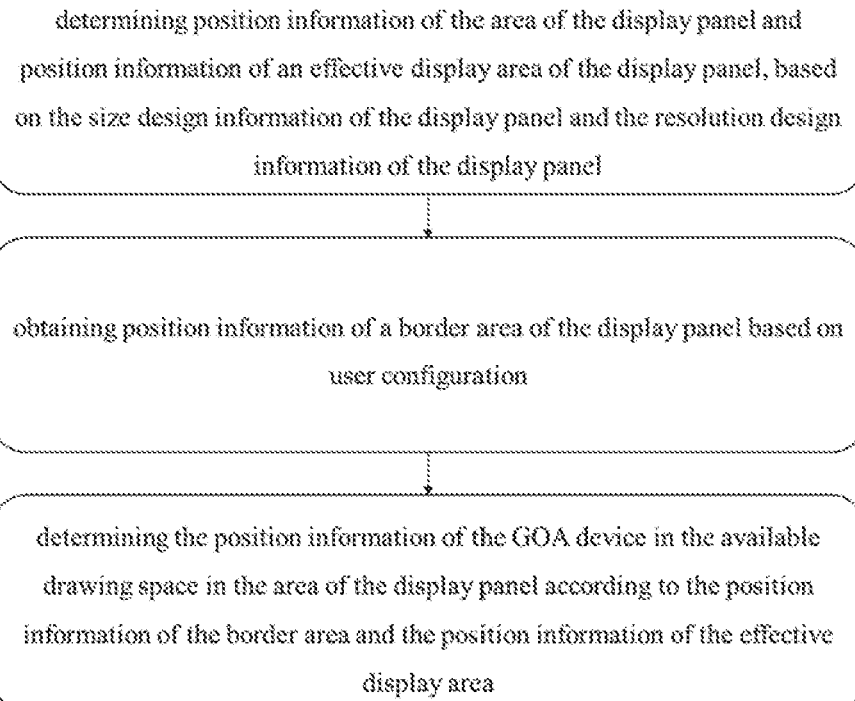
FIG. 2 is a schematic flowchart of Step 101 according to an embodiment of the present application.

In some embodiments of the present application, as shown in FIG. 2, determining, in the preset drawing space, the position information of the GOA device in the available drawing space in the area of the display panel according to the size design information and the resolution design information of the display panel includes steps of:

Step 201: determining position information of the area of the display panel and position information of an effective display area of the display panel, based on the size design information of the display panel and the resolution design information of the display panel.

Since a design size of the display panel is generally a diagonal length of the display panel, and the size design information of the display panel includes the diagonal length of the effective display area in the display panel, such as the diagonal length of the effective display area of a 55' UHD display panel is 138731.517152 um.

In Step 201, determining the position information of the area of the display panel and the position information of the effective display area of the display panel based on the size design information of the display panel and the resolution design information of the display panel may include: directly determining position information of a rectangular confined by the available drawing space in the area of the display panel at random to obtain an aspect ratio of the display panel, based on the size design information of the panel and the resolution design information of the display panel; calculating a length and width of the effective display area in the display panel according to the aspect ratio of the display panel and the diagonal length of the effective display area in the display panel, based on the Pythagorean theorem; determining the position information of the effective display area in the display panel area according to the length and width of the effective display area in the display panel and the resolution design information of the display panel.

Wherein, the aspect ratio (style) of the display panel is generally fixed, such as 16:9, or is changed individually in designs, such as 21:9, the aspect ratio of the display panel can be obtained based on user input.

The following describes how to determine the position information of the area of the display panel and the position information of the effective display area of the display panel based on the size design information of the display panel and the resolution design information of the display panel in conjunction with specific examples.

The design size of the display panel: size (diagonal length, unit: inches); the aspect ratio of the display panel: style; the design resolution of the display panel: Reso (resolution), a size of a single pixel: pixel length (A), pixel width (B).

The length and width of the effective display area can be calculated by the following formula:

$$Length^2 + Width^2 = Size^2$$

$$Width = \sqrt{Size^2/(1+Style^2)}$$

$$Length = Width * Style$$

According to the length and width of the effective display area, such as a 55' UHD display panel (a diagonal length is 138731.517152) with an aspect ratio of 16:9 and according to the Pythagorean theorem, the length and width of the effective display are 1209600 um and 680400 um, respectively. After determining the length and width of the effective display area, the position information of the effective display area of the display panel can be determined.

In addition, the design resolution is 2160*3840, and a size of a single pixel can also be calculated: pixel length (A)=680400/2160=315 um; pixel width (B)=1209600/3840/3(RGB)=105 um.

Step 202: obtaining position information of a border area of the display panel based on user configuration.

When driving design on gate electrodes, the position information of the border area of the display panel may be configured by directly input by a user, that is, the position information of the border area of the display panel configured by the user can be obtained according to the border of the display panel and a gate electrode driving design device.

Step 203: determining the position information of the GOA device in the available drawing space in the area of the display panel according to the position information of the border area and the position information of the effective display area.

After determining the position information of the border area of the display panel and the position information of the effective display area of the display panel, an area between the border area of the display panel and the effective display area of the display panel can be determined as the position information of the available drawing space of the GOA device.

In some embodiments of the present application, the position information of the effective display area includes height information and width information of the effective display area, and the position information of the border area includes height information and width information of the border area.

The GOA device includes a plurality of GOA units, and determining the position information of the GOA device in the available drawing space in the area of the display panel according to the position information of the border area and the position information of the effective display area includes steps of:

(1) determining height information of each of pixels in the effective display area according to the height information of the effective display area;

(2) taking the height information of each of the pixels as height information of the available drawing space of each of the GOA units;

(3) taking the width information of the border area as width information of the available drawing space of each of the GOA units;

(4) determining position information of a rectangular confined by the available drawing space of each of the GOA units according to the height information of the available drawing space of each of the GOA units and the width information of the available drawing space of each of the GOA units;

(5) determining position information of a rectangular confined by the available drawing space of the GOA device in the area of the display panel according to the position information of the available drawing space of the GOA units corresponding to the plurality of the GOA units.

In one specific embodiment, a GOA unit height A: a height of a size of a pixel of the display panel (that is, a distance between a $n^{th}$ pixel gate and a $n+1^{th}$ pixel gate, which is related to a size of the display panel).

A GOA unit length B: which is determined according to a size of the border, by estimating wire-on-array (WOA) signal wiring, busline wiring, and a distance from active area (AA). A layout space for driving design on gate electrodes is determined, which is defined as a GOA unit boundary. The GOA driving gate electrode of the entire display panel is formed by a cyclic array of GOA units. First, a single-foot GOA unit is automatically completed.

In some embodiments of the present application, the target GOA design strategy information includes circuit diagram information of the GOA unit and layout information of the plurality of GOA units. Therefore, drawing the GOA device pattern in the available drawing space of the GOA device, based on the target GOA design strategy information in step 105 includes steps of: drawing a design pattern of each of the GOA units in the available drawing space of each of the GOA units according to the circuit diagram information of the GOA unit; and drawing an array pattern of the plurality of GOA units according to the layout information of the plurality of GOA units.

In some embodiments of the present application, the plurality of the GOA units have a same circuit structure, the circuit diagram information of the GOA unit is same circuit diagram information for the plurality of GOA units, and drawing the design pattern of each of the GOA units in the available drawing space of each of the GOA units according to the circuit diagram information of the GOA unit includes steps of: drawing a shared design pattern for the plurality of GOA units according to the circuit diagram information of the GOA unit; and filling the shared design pattern into the available drawing space of each of the GOA units to implement drawing the design pattern of each of the GOA units.

In some embodiments of the present application, drawing the shared design pattern for the plurality of GOA units according to the circuit diagram information of the GOA unit includes steps of: determining information of various circuit design objects in the circuit diagram information of the GOA unit, wherein the circuit design objects include electronic components and circuit connection lines; searching a preset size database of the circuit design objects of the display panel for reference size information of each of the circuit design objects according to the size design information of the display panel; determining size information of each of the circuit design objects according to the reference size information; and drawing the shared design pattern of the plurality of GOA units according to the size information of each of the circuit design objects.

Figure 3:
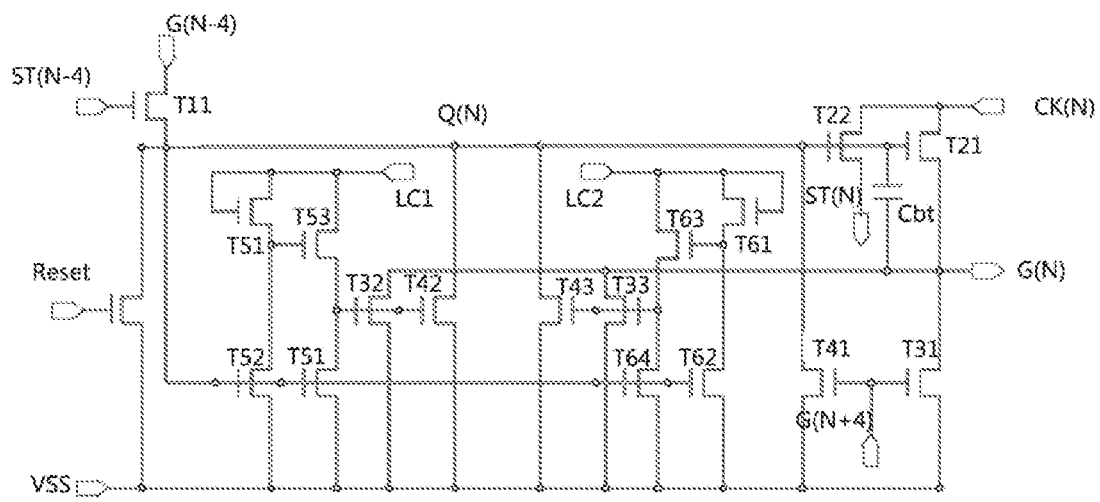
FIG. 3 is a schematic diagram showing a circuit structure of a gate-on-array (GOA) unit according to an embodiment of the present application.

In the embodiment of the present application, the circuit design objects may be various circuit design objects in the GOA units, such as TFT. As shown in FIG. 3, which is a schematic diagram showing a GOA circuit having GOA driving stages of 8CK, the GOA driving stages of 8CK is generally composed of TFTs (T11-T44) shown in FIG. 4.

Since the plurality of GOA units may be the same, drawing of TFTs of a part of the GOA units and placement thereof is taken as an example below to illustrate processes of drawing the shared design pattern of the plurality of GOA units according to size information of each circuit design object, details as follows:

T11 automatic layout: W/L is known, card control upper and lower unit spacing, right-side routing is aligned with the GOA unit boundary, M2, routing, M1, spacing alignment can be aligned according to the preset GOA design strategy information. See the following reference values for details:

1. Single TFT source/drain/channel length size (such as A=5 um/B=6 um/C=4.5 um), W/L is input to automatically draw a T11 pattern, such as W/L=3800/6. Comparing to two ends of the TFT, a source width and a middle position source need to be complemented (in this case, the width is 6 um=A+1 um, and it is required for GOA TFT).

2. T11 routing width D=12 um, a distance between two GOA units E=14 um, a pitch between M2 routing and M1 routing G=6 um.

3. TFTs may be placed horizontally, or be placed on top of two rows, which depends on a space.

4. A pitch between TFT M2/halftone and the underlying M1 may be adjusted individually (for example, set F=6 um for up, down, left and right)).

T43 automatic layout: T43 pass through a left side of the GOA unit, upper and lower spacing card control, based on T33.

1. Single TFT source/drain/channel length size (such as A=5 um/B=6 um/C=5.5 um), W/L is input to automatically generate T43, such as W/L=650 um/7 um.

2. T33, T43 TFT on-top arrangement design, halftone to halftone distance is a routing width M=12 um.

3. A distance from T33 and T43 to upper, lower, and left of the GOA unit are D, E, H, I, N. For example, D=625 um, E=38 um, H=45 um, the I=625 um, note that the M1 spacing N=10 um.

It should be noted that the drawing of the above two TFTs (T11, T43) are only examples, and other TFTs in the GOA unit can be drawn with reference to a similar process, and the details are not limited here.

Specifically, when determining the size information of each circuit design object according to the reference size information, the first size information of each circuit design object may be determined according to the reference size information first, and the size information is subjected to a GOA drawing simulation. If it does not meet requirements of preset functions (such as preset module electrical parameter requirements or preset pixel CR requirements), the size information of each circuit design object is readjusted until the GOA drawing simulation meets the requirements of preset functions, and the size information of each circuit design object that meets the requirements of preset functions is determined.

In one specific embodiment, a first GOA layout (GOA drawing simulation) is assumed:

(1) automatically calculating a size of each of TFTs shown in FIG. 4 according to the reference size information:

(2) automatically filling into a module electrical parameter table, and simulating Q/G waveforms and each key parameter:

It is supposed that Q (N)/G(N) point waveform evaluation: selecting a $49^{th}$-staged Q (N)/G(N) waveform. Assuming the evaluation of pixel CR: under a specific wrong charging voltage, single-point CR is only 80.28%, which does not meet the design requirements, indicating that the pixel is obviously insufficiently charged.

In this case, a TFT size can be adjusted associated of which, such as increasing sizes of T21/T11 of TFTs. The simulation of various electrical parameters is performed again, and the effect of the automatic GOA layout is evaluated.

Figures 5, 6:
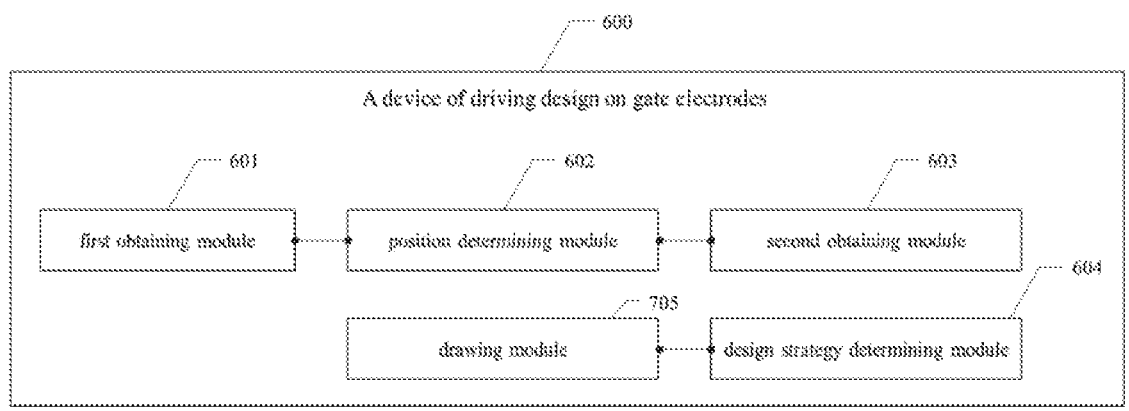
FIG. 5 is a table of a TFT size in a second GOA layout according to an embodiment of the present application.
FIG. 6 is a schematic diagram showing a device of driving design on gate electrodes according to an embodiment of the present application.

A Second GOA Layout:

As shown in FIG. 5, sizes of T21/T11 of the TFTs are increased, a GOA layout space is satisfied, and then continue the electrical evaluation:

Q (N)/G(N) point waveform evaluation: selecting the 49th-staged Q (N)/G(N) waveform, the Q (point) waveform is normal, the continued transmission is OK, the G (N) point waveform is normal;

Pixel CR evaluation: under specific wrong charging voltage, single-point CR can reach 89.58%, re-evaluate OC nine-point charging rate: charging waveform, pixel CR and CR U % meet the requirements, further Vth/working temperature margin, etc., are evaluated: For example, when Vth is at negative drift of −8V, the Q point is difficult to pull up, and the subsequent transfer and charging are insufficient, but the −5V transfer is OK. When the positive drift is +6V, the transfer is NG, and the 4V is OK, so the Vth drift voltage range is −5V-4V, the drift characteristics meet the design requirements, and the size information of each circuit design object in the current GOA is determined.

In other embodiments of the present application, the plurality of GOA units include two types of circuit structures, the plurality of GOA units include at least one first GOA unit and at least one second GOA unit, the circuit diagram information of the GOA unit includes a first circuit diagram information corresponding to the first GOA unit and a second circuit diagram information corresponding to the second GOA unit, and the first GOA unit and the second GOA unit have no intersection.

Therefore, drawing the design pattern of each of the GOA units in the available drawing space of each of the GOA units according to the circuit diagram information of the GOA unit includes steps of: drawing a first shared design pattern of the first GOA unit according to the first circuit diagram information; drawing a second shared design pattern of the second GOA unit according to the second circuit diagram information; filling the first shared design pattern into the available drawing space of each the first GOA unit to implement drawing a design pattern of the first GOA unit; and filling the second shared design pattern into the available drawing space of each the second GOA unit to implement drawing a design pattern of the second GOA unit.

In some embodiments of the present application, drawing the array pattern of the plurality of GOA units according to the layout information of the plurality of GOA units includes steps of: drawing clock driving patterns of a target number according to the size design information of the display panel; aligning first-few GOA units of a target number among the plurality of GOA units with the clock driving patterns of the target number; and drawing a virtual thin-film-transistor (TFT) and a virtual capacitor, and aligning the virtual TFT with a first-staged GOA unit of the plurality of GOA units and aligning the virtual capacitor with a last-staged GOA unit of the plurality of GOA units.

In some embodiments of the present application, drawing the clock driving patterns of the target number according to the size design information of the display panel includes steps of: searching a preset size database of the clock driving patterns of the display panel for reference size information of the clock driving patterns according to the size design information of the display panel; determining size information of each of the clock driving patterns according to the reference size information of the clock driving patterns; and drawing the clock driving patterns of the target number according to the size information of each of the clock driving patterns of the display panel.

In some embodiments of the present application, the plurality of GOA design strategies include a plurality of GOA strategies with different numbers of the clock driving signals, and determining the target GOA strategy design information used for the current gate electrode driving design among the plurality of preset GOA design strategies, based on the target clock driving information includes steps of: determining the target GOA design strategy information corresponding to the clock driving signals of the target number among the plurality of preset GOA design strategies, according to the clock driving information of the clock driving signals of the target number.

In one specific embodiment, according to the layout information of the plurality of GOA units, drawing the array pattern of the plurality of GOA units may include the following process:

(1) TFT layout and placement for a head/tail part of the GOA device:

1. A GOA device head-end design: in the GOA device head-end (the first eight-stages of the GOA units, that is, CK1-CK8 design), the first eight-stages same GOA unit alignment method, the added dummy TFT is aligned with the determined Vss+ first-staged GOA unit.

2. A GOA device tail-end design: referring to the last-staged GOA circuit & Vss position, dummy capacitor C_end is aligned according to 4th GOA unit & VSS, STV & reset winding resistor is aligned via VSS.

(2) busline & via layout and placement:

1. Busline automatic layout: locating by the GOA unit boundary and the TFT glass; taking the busline corresponding to a group of GOA unit as the smallest circuit unit.

2. Via hole automatic layout (for transmitting signals and bridging different metal layers): a via distance M1 edge distance is taken as a reference, typically a size of the via is adjustable (rectangular or square, or octagonal); it can be identified via hole designs of deep and shallow holes: the via holes in a GOA area & busline area are designed with deep and shallow holes. The choice of the deep and shallow holes is related to the placement of each TFT and a signal access position, and it is automatically identified.

3. GOA circuit automatic layout: using pixel gate access position for alignment, and the number of GOA unit groups is determined according to the resolution, for example, the resolution is 1920*1080, the number of GOA circuit cycles=1080 groups, the composition of a part of the entire GOA device=GOA circuit (matching with the design resolution and design size of the display panel)+4-stage of dummy GOA at the end. The pre-layout of each GOA module is automatically completed.

4. GOA circuits at all stages are automatically connected. According to a circuit model built by spice, signals of each module of the GOA pre-layout is automatically connected.

5. A preset design rule inspection module is called: checking whether the automatic drawing layout conforms to the specification, and automatically modify the pattern if the rule is break.

6. Automatically extract RC loading of the gate electrode of each module, writing the GOA RC section into the simulation file: CK1-CK8, LC1/LC2, Vss, STV, Data, the initial timing and voltage of the signal can be automatically generated according to the input refresh rate.

7. The circuit simulation module is called to evaluate the key parameters margin of GOA device design, such as CR, feedthrough, Q point/N point waveform evaluation, Vth positive drift/negative drift margin, operating temperature margin.

8. The GOA design of the gate electrodes that meets the design specifications of the display panel is judged: according to target values of each evaluation parameter of the preset min/max range, judging whether the automatically designed GOA layout meets the design specifications. If it meets specifications, output a gate electrode layout file and the evaluation results of each parameter.

9. If it does not meet the display panel design specifications: GOA optimization iteration is performed automatically, mainly by adjusting the TFT size and the collocation of each TFT, considering the power consumption of the circuit, iterating repeatedly until the optimal combination is selected.

Generally, in order to make the designed display panel meet the requirements of driving principles in various situations, the design concept adopted is "worst case design", that is, if it is able to be used under extreme conditions when designing, then there is no problem in other situations. For example, if the frame frequency of an image is 60 to 75 Hz, 75 Hz is considered for charging time, and 60 Hz is considered for charge retention time, so that if the two extreme conditions can be met, other frequencies can definitely be met. Therefore, similar principles are also adopted in the embodiments of the present application. In some of the above-mentioned specific embodiments, If only a single value is listed, it means that the value in the single value is the worst-case design value. In contrast, if the design value is good, the design requirement is met.

It should be noted that the GOA design strategy in the above embodiments is only a part of examples in the GOA design strategies. It can be understood that in addition to the GOA design strategy mentioned above, in the embodiment of the present application, the GOA design strategy may further include any other more GOA design strategies, such as GOA design strategies for more clock driving signals, it will not be described in detail in the embodiments of the present application. Any GOA design strategy based on design specifications can be adopted based on the inventive idea of the present application, the details are not limited here.

In addition, in an actual application process, design strategies of different display panels can be set for different display panels, and in order to achieve the optimization of a certain characteristic of the display panel, more design parameters can be set with design strategies relevant to the display panel to indirectly increase the resolution of a display device to meet the design requirements for higher resolution of the display device.

As the display panel technology has been advancing, the design specifications of the display panel have also been updated. Therefore, if the GOA design specifications are updated due to process refinement and design optimization, the GOA design strategy of the display panel can be updated simultaneously. Specifically, In some embodiments of the present application, the method of driving design on gate electrodes may further include: obtaining an updated GOA design strategy of the display panel, and the updated GOA design strategy includes at least one structure of the GOA design strategy in the GOA device, or the correspondence between at least two GOA structures; based on the updated GOA design strategy, the GOA design strategy of the display panel is updated. Later, based on the updated GOA design strategy of the display panel, new GOA units or GOA device patterns can be drawn.

In order to better implement the method of driving design on gate electrodes of the embodiment of the present application, on the basis of the method of driving design on gate electrodes, an embodiment of the present application further provides a device of driving design on gate electrodes. As shown in FIG. 6, the device of driving design on gate electrodes 600 includes:

a first obtaining module 601, which is configured to obtain size design information of a display panel and resolution design information of the display panel based on user configuration;

a position determining module 602, which is configured to determine, in a preset drawing space, position information of a gate-on-array (GOA) device in an available drawing space in an area of the display panel according to the size design information and the resolution design information of the display panel;

a second obtaining module 603, which is configured to obtain target clock driving information used for a current gate electrode driving design, wherein the target clock driving information is configured to limit a target number of clock driving signals used in a current GOA device;

a design strategy determining module 604, which is configured to determine target GOA design strategy information used for the current gate electrode driving design among a plurality of preset GOA design strategies, based on the target clock driving information; and a drawing module 605, which is configured to draw a GOA device pattern in the available drawing space of the GOA device, based on the target GOA design strategy information.

According to the present application, in stages of driving design on gate electrodes of the display panel, the position information of the available drawing space of the GOA device and the target GOA design strategy information are automatically determined in the preset drawing space based on user configuration information, to realize rapid drawing of GOA device patterns in the available drawing space of the GOA device, reducing dependence on designers' design experience, eliminating a need for designers to manually calculate design parameters, shortening design time and evaluation time for the display panel, quickly producing gate electrode driving designs that meet requirements, improving research and development efficiency, and saving human resources and costs.

In some embodiments of the present application, the position determining module 602 is specifically configured to:

determine position information of the area of the display panel and position information of an effective display area of the display panel, based on the size design information of the display panel and the resolution design information of the display panel;

obtain position information of a border area of the display panel based on user configuration; and determine the position information of the GOA device in the available drawing space in the area of the display panel according to the position information of the border area and the position information of the effective display area.

In some embodiments of the present application, the position information of the effective display area includes height information and width information of the effective display area, the position information of the border area includes height information and width information of the border area, the GOA device includes a plurality of GOA units, and the position determining module 602 is specifically configured to:

determine height information of each of pixels in the effective display area according to the height information of the effective display area;

take the height information of each of the pixels as height information of the available drawing space of each of the GOA units;

take the width information of the border area as width information of the available drawing space of each of the GOA units;

determine position information of a rectangular confined by the available drawing space of each of the GOA units according to the height information of the available drawing space of each of the GOA units and the width information of the available drawing space of each of the GOA units; and determine position information of a rectangular confined by the available drawing space of the GOA device in the area of the display panel according to the position information of the available drawing space of the GOA units corresponding to the plurality of the GOA units.

In some embodiments of the present application, the target GOA design strategy information includes circuit diagram information of the GOA unit and layout information of the plurality of GOA units.

The drawing module 605 is specifically configured to:

draw a design pattern of each of the GOA units in the available drawing space of each of the GOA units according to the circuit diagram information of the GOA units; and draw an array pattern of the plurality of GOA units according to the layout information of the plurality of GOA units.

In some embodiments of the present application, the plurality of the GOA units have a same circuit structure, the circuit diagram information of the GOA unit is same circuit diagram information for the plurality of GOA units, and the drawing module 605 is specifically configured to:

draw a shared design pattern for the plurality of GOA units according to the circuit diagram information of the GOA unit; and fill the shared design patterns into the available drawing space of each of the GOA units to implement drawing the design pattern of each of the GOA units.

In some embodiments of the present application, the drawing module 605 is specifically configured to:

determine information of various circuit design objects in the circuit diagram information of the GOA unit, wherein the circuit design objects include electronic components and circuit connection lines;

search a preset size database of the circuit design objects of the display panel for reference size information of each the circuit design objects according to the size design information of the display panel;

determining size information of each of the circuit design objects according to the reference size information; and drawing the shared design pattern of the plurality of GOA units according to the size information of each of the circuit design objects.

In some embodiments of the present application, the plurality of GOA units include two types of circuit structures, the plurality of GOA units include at least one first GOA unit and at least one second GOA unit, the circuit diagram information of the GOA unit includes a first circuit diagram information corresponding to the first GOA unit and a second circuit diagram information corresponding to the second GOA unit, and the drawing module 605 is specifically configured to:

draw a first shared design pattern of the first GOA unit according to the first circuit diagram information;

draw a second shared design pattern of the second GOA unit according to the second circuit diagram information;

fill the first shared design pattern into the available drawing space of each the first GOA unit to implement drawing a design pattern of the first GOA unit; and fill the second shared design pattern into the available drawing space of each the second GOA unit to implement drawing a design pattern of the second GOA unit.

In some embodiments of the present application, the drawing module 605 is specifically configured to:

draw clock driving patterns of a target number according to the size design information of the display panel;

align first-few GOA units of a target number among the plurality of GOA units with the clock driving patterns of the target number; and draw a virtual thin-film-transistor (TFT) and a virtual capacitor, and aligning the virtual TFT with a first-staged GOA unit of the plurality of GOA units and aligning the virtual capacitor with a last-staged GOA unit of the plurality of GOA units.

In some embodiments of the present application, the drawing module 605 is specifically configured to:

search a preset size database of the clock driving patterns of the display panel for reference size information of the clock driving patterns according to the size design information of the display panel;

determine size information of each of the clock driving patterns according to the reference size information of the clock driving patterns; and draw the clock driving patterns of the target number according to the size information of each of the clock driving patterns of the display panel.

In some embodiments of the present application, the plurality of GOA design strategies include a plurality of GOA strategies with different numbers of the clock driving signals.

The design strategy determining module 604 is specifically configured to:

determine the target GOA design strategy information corresponding to the clock driving signals of the target number among the plurality of preset GOA design strategies, according to the clock driving information of the clock driving signals of the target number.

An embodiment of the present invention further provides an electronic device, which integrates any device of driving design on gate electrodes provided by the embodiments of the present invention, and the electronic device includes:

one or more processors;

a memory; and one or more application programs, wherein the one or more application programs are stored in the memory and configured to be executed by the processors to implement the steps of the method of driving design on gate electrodes described in any one of the embodiments of the method of driving design on gate electrodes.

Figure 7:
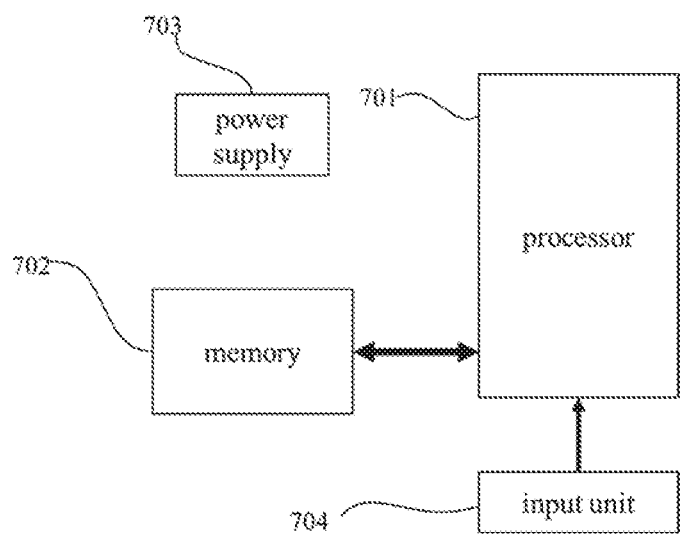
FIG. 7 is a schematic diagram showing an electronic device according to an embodiment of the present application.

An embodiment of the present invention further provides an electronic device, which integrates any device of driving design on gate electrodes provided by the embodiments of the present invention. As shown in FIG. 7, which is a schematic structural diagram showing an electronic device according to an embodiment of the present invention. Specifically:

The electronic device may include processors having one or more processing cores 701, a memory 702 having one or more computer-readable storage media, a power supply 703, and an input unit 704, and the like. Persons skilled in this art may understand that a structure of the electronic device shown in FIG. 7 does not constitute a limitation on the electronic device, and may include more or fewer components than shown, or a combination of some components, or a different component arrangement. Wherein:

A processor 701 is a control center of the electronic device, using various interfaces and wires to connect various parts of the entire electronic device. Various functions and processing data of the electronic device are executed by running or executing software programs and/or modules stored in the memory 702, and recalling data stored in the memory 702, thereby monitoring overall the electronic device. Optionally, the processor 701 may include one or more processing cores. Preferably, the processor 701 may be integrated to application processors and modem processors, wherein the application processors mainly deal with operation system, user interface, and application programs, and the like. The modem processors mainly deal with wireless communication. It can be understood that the above modem processors may also not be integrated to the processor 701.

The memory 702 is able to be configured to store software programs and modules. The software programs stored in the memory 702 and the modules are run by the processor 701, thereby executing various function applications and data processing. The memory 702 may include a program storage area and a data storage area, wherein the program storage area may store the operation system, application programs required by at least one function (such as functions of sound playback and function of image playback), and the like. The data storage area may store, such as, data created according to the use of the electronic device. In addition, the memory 702 may include a high-speed random-access memory, and may also include a non-volatile memory, such as at least one magnetic disk storage device, flash memory device, or other volatile solid-state storage devices. Correspondingly, the memory 702 may further include a memory controller to provide the processor 701 with access to the memory 702.

The electronic device further includes the power supply 703 used for various components. Preferably, the power supply 703 can be logically connected to the processor 701 by a power management system, thereby realizing functions of management of charging, discharging, and power consumption management, and the like by the power management system. The power supply 703 may further include components such as one or more direct current (DC) or alternating current (AC) powers, recharging systems, power failure detection circuits, power converters or inverters, power status indicators.

The electronic device further includes the input unit 704, which is able to be configured to receive entered numbers or character information, and generate optical or trackball signal input signals of a keyboard, a mouse, and an operating arm related to user configuration and function control.

Although not shown, the electronic device may further include a display unit, etc., and it will not be repeated here. Specifically, in the present embodiment, the processor 701 in the electronic device will load executable files corresponding to processes of one or more application programs into the memory 702 according to the following instructions, and the processor 701 runs the application programs stored in the memory 702 to realize various functions below:

obtaining size design information of a display panel and resolution design information of the display panel based on user configuration;

determining, in a preset drawing space, position information of a gate-on-array (GOA) device in an available drawing space in an area of the display panel according to the size design information and the resolution design information of the display panel;

obtaining target clock driving information used for a current gate electrode driving design, wherein the target clock driving information is configured to limit a target number of clock driving signals used in a current GOA device;

determining target GOA design strategy information used for the current gate electrode driving design among a plurality of preset GOA design strategies, based on the target clock driving information; and drawing a GOA device pattern in the available drawing space of the GOA device, based on the target GOA design strategy information.

Persons skilled in this art can understand that all or a part of steps in various ways of the foregoing embodiments can be completed by instructions or by related hardware controlled by the instructions, and the instructions can be stored in one computer-readable storage medium, and loaded and executed by the processor.

Therefore, an embodiment of the present invention provides a computer-readable storage medium, which may include a read only memory (ROM), a random-access memory (RAM), a magnetic disk or optical disk, and the like. Computer programs are stored thereon, and the computer programs are loaded by the processor to execute any step in the method of driving design on gate electrodes provided by the embodiment of the present invention. For example, the computer programs can be loaded by the processor to execute steps of:

obtaining size design information of a display panel and resolution design information of the display panel based on user configuration;

determining, in a preset drawing space, position information of a gate-on-array (GOA) device in an available drawing space in an area of the display panel according to the size design information and the resolution design information of the display panel;

obtaining target clock driving information used for a current gate electrode driving design, wherein the target clock driving information is configured to limit a target number of clock driving signals used in a current GOA device;

determining target GOA design strategy information used for the current gate electrode driving design among a plurality of preset GOA design strategies, based on the target clock driving information; and drawing a GOA device pattern in the available drawing space of the GOA device, based on the target GOA design strategy information.

In the above-mentioned embodiments, descriptions of each embodiment have their own focus. For parts that is not described in detail in one embodiment, the detailed description of other embodiments described above may be referred, it will not be repeated here.

While implementing specifically, various units or structures described above can be implemented as independent entities, or can be combined arbitrarily into the same or multiple entities to implement. For specific implementation of each of the units or structures described above, the embodiments of the above-mentioned method may be referred, it will not be repeated here.

For specific implementation of operations described above, the above-mentioned embodiments may be referred, it will not be repeated here.

The above descriptions are a detailed introduction to the method of driving design on gate electrodes, and the device and electronic device thereof provided by the embodiments of the present application. Specific examples are used in the context to illustrate principles and implementations of the present application. The descriptions of the above embodiments are only used to help understand the methods and core ideas of the present application. Moreover, for persons skilled in this art, there will be changes in the specific implementations and an application scope thereof, according to ideas of the present application. In summary, the content of the present specification should not be construed as a limitation to the present application.

What is claimed is:

1. A method of driving design on gate electrodes, comprising steps of:

obtaining size design information of a display panel and resolution design information of the display panel based on user configuration;

determining, in a preset drawing space, position information of a gate-on-array (GOA) device in an available drawing space in an area of the display panel according to the size design information and the resolution design information of the display panel;

obtaining target clock driving information used for a current gate electrode driving design, wherein the target clock driving information is configured to limit a target number of clock driving signals used in a current GOA device;

determining target GOA design strategy information used for the current gate electrode driving design among a plurality of preset GOA design strategies, based on the target clock driving information; and drawing a GOA device pattern in the available drawing space of the GOA device, based on the target GOA design strategy information.

2. The method as claimed in claim 1, wherein determining, in the preset drawing space, the position information of the GOA device in the available drawing space in the area of the display panel according to the size design information and the resolution design information of the display panel comprises steps of:

determining position information of the area of the display panel and position information of an effective display area of the display panel, based on the size design information of the display panel and the resolution design information of the display panel;

obtaining position information of a border area of the display panel based on user configuration; and determining the position information of the GOA device in the available drawing space in the area of the display panel according to the position information of the border area and the position information of the effective display area.

3. The method as claimed in claim 2, wherein the position information of the effective display area comprises height information and width information of the effective display area, the position information of the border area comprises height information and width information of the border area, the GOA device comprises a plurality of GOA units, and determining the position information of the GOA device in the available drawing space in the area of the display panel according to the position information of the border area and the position information of the effective display area comprises steps of:

determining height information of each of pixels in the effective display area according to the height information of the effective display area;

taking the height information of each of the pixels as height information of the available drawing space of each of the GOA units;

taking the width information of the border area as width information of the available drawing space of each of the GOA units;

determining position information of a rectangle confined by the available drawing space of each of the GOA units according to the height information of the available drawing space of each of the GOA units and the width information of the available drawing space of each of the GOA units; and determining position information of a rectangle confined by the available drawing space of the GOA device in the area of the display panel according to the position information of the available drawing space of the GOA units corresponding to the plurality of the GOA units.

4. The method as claimed in claim 3, wherein the target GOA design strategy information comprises circuit diagram information of the GOA unit and layout information of the plurality of GOA units, and wherein drawing the GOA device pattern in the available drawing space of the GOA device, based on the target GOA design strategy information comprises steps of:

drawing a design pattern of each of the GOA units in the available drawing space of each of the GOA units according to the circuit diagram information of the GOA unit; and drawing an array pattern of the plurality of GOA units according to the layout information of the plurality of GOA units.

5. The method as claimed in claim 4, wherein the plurality of the GOA units have a same circuit structure, the circuit diagram information of the GOA unit is same circuit diagram information for the plurality of GOA units, and drawing the design pattern of each of the GOA units in the available drawing space of each of the GOA units according to the circuit diagram information of the GOA unit comprises steps of:

drawing a shared design pattern for the plurality of GOA units according to the circuit diagram information of the GOA unit; and filling the shared design pattern into the available drawing space of each of the GOA units to implement drawing the design pattern of each of the GOA units.

6. The method as claimed in claim 5, wherein drawing the shared design pattern for the plurality of GOA units according to the circuit diagram information of the GOA unit comprises steps of:

determining information of various circuit design objects in the circuit diagram information of the GOA unit, wherein the circuit design objects comprise electronic components and circuit connection lines;

searching a preset size database of the circuit design objects of the display panel for reference size information of each of the circuit design objects according to the size design information of the display panel;

determining size information of each of the circuit design objects according to the reference size information; and drawing the shared design pattern of the plurality of GOA units according to the size information of each of the circuit design objects.

7. The method as claimed in claim 4, wherein the plurality of GOA units comprise two types of circuit structures, the plurality of GOA units comprise at least one first GOA unit and at least one second GOA unit, the circuit diagram information of the GOA unit comprises a first circuit diagram information corresponding to the first GOA unit and a second circuit diagram information corresponding to the second GOA unit, and drawing the design pattern of each of the GOA units in the available drawing space of each of the GOA units according to the circuit diagram information of the GOA unit comprises steps of:

drawing a first shared design pattern of the first GOA unit according to the first circuit diagram information;

drawing a second shared design pattern of the second GOA unit according to the second circuit diagram information;

filling the first shared design pattern into the available drawing space of each the first GOA unit to implement drawing a design pattern of the first GOA unit; and filling the second shared design pattern into the available drawing space of each the second GOA unit to implement drawing a design pattern of the second GOA unit.

8. The method as claimed in claim 4, wherein drawing the array pattern of the plurality of GOA units according to the layout information of the plurality of GOA units comprises steps of:

drawing clock driving patterns of a target number according to the size design information of the display panel;

aligning first-few GOA units of a target number among the plurality of GOA units with the clock driving patterns of the target number; and drawing a virtual thin-film-transistor (TFT) and a virtual capacitor, and aligning the virtual TFT with a first-staged GOA unit of the plurality of GOA units and aligning the virtual capacitor with a last-staged GOA unit of the plurality of GOA units.

9. The method as claimed in claim 8, wherein drawing the clock driving patterns of the target number according to the size design information of the display panel comprises steps of:
    searching a preset size database of the clock driving patterns of the display panel for reference size information of the clock driving patterns according to the size design information of the display panel;
    determining size information of each of the clock driving patterns according to the reference size information of the clock driving patterns; and
    drawing the clock driving patterns of the target number according to the size information of each of the clock driving patterns of the display panel.

10. The method as claimed in claim 1, wherein the plurality of GOA design strategies comprise a plurality of GOA strategies with different numbers of the clock driving signals, and determining the target GOA strategy design information used for the current gate electrode driving design among the plurality of preset GOA design strategies, based on the target clock driving information comprises steps of:
    determining the target GOA design strategy information corresponding to the clock driving signals of the target number among the plurality of preset GOA design strategies, according to the clock driving information of the clock driving signals of the target number.

11. An electronic device, comprising:
    one or more processors;
    a memory; and
    one or more application programs, wherein the one or more application programs are stored in the memory and configured to be executed by the processors to implement the method of driving design on gate electrodes as claimed in claim 1.

12. A device of driving design on gate electrodes, comprising:
    a first obtaining module configured to obtain size design information of a display panel and resolution design information of the display panel based on user configuration;
    a position determining module configured to determine, in a preset drawing space, position information of a gate-on-array (GOA) device in an available drawing space in an area of the display panel according to the size design information and the resolution design information of the display panel;
    a second obtaining module configured to obtain target clock driving information used for a current gate electrode driving design, wherein the target clock driving information is configured to limit a target number of clock driving signals used in a current GOA device;
    a design strategy determining module configured to determine target GOA design strategy information used for the current gate electrode driving design among a plurality of preset GOA design strategies, based on the target clock driving information; and
    a drawing module configured to draw a GOA device pattern in the available drawing space of the GOA device, based on the target GOA design strategy information.

13. The device as claimed in claim 12, wherein the position determining module is specifically configured to:
    determine position information of the area of the display panel and position information of an effective display area of the display panel, based on the size design information of the display panel and the resolution design information of the display panel;
    obtain position information of a border area of the display panel based on user configuration; and
    determine the position information of the GOA device in the available drawing space in the area of the display panel according to the position information of the border area and the position information of the effective display area.

14. The device as claimed in claim 13, wherein the position information of the effective display area comprises height information and width information of the effective display area, the position information of the border area comprises height information and width information of the border area, the GOA device comprises a plurality of GOA units, and the position determining module is specifically configured to:
    determine height information of each of pixels in the effective display area according to the height information of the effective display area;
    take the height information of each of the pixels as height information of the available drawing space of each of the GOA units;
    take the width information of the border area as width information of the available drawing space of each of the GOA units;
    determine position information of a rectangle confined by the available drawing space of each of the GOA units according to the height information of the available drawing space of each of the GOA units and the width information of the available drawing space of each of the GOA units; and
    determine position information of a rectangle confined by the available drawing space of the GOA device in the area of the display panel according to the position information of the available drawing space of the GOA units corresponding to the plurality of the GOA units.

15. The device as claimed in claim 14, wherein the target GOA design strategy information comprises circuit diagram information of the GOA unit and layout information of the plurality of GOA units, and the drawing module is specifically configured to:
    draw a design pattern of each of the GOA units in the available drawing space of each of the GOA units according to the circuit diagram information of the GOA units; and
    draw an array pattern of the plurality of GOA units according to the layout information of the plurality of GOA units.

16. The device as claimed in claim 15, wherein the plurality of the GOA units have a same circuit structure, the circuit diagram information of the GOA unit is same circuit diagram information for the plurality of GOA units, and the drawing module is specifically configured to:
    draw a shared design pattern for the plurality of GOA units according to the circuit diagram information of the GOA unit; and
    fill the shared design patterns into the available drawing space of each of the GOA units to implement drawing the design pattern of each of the GOA units.

17. The device as claimed in claim 16, wherein the drawing module is specifically configured to:
    determine information of various circuit design objects in the circuit diagram information of the GOA unit, wherein the circuit design objects comprise electronic components and circuit connection lines;

search a preset size database of the circuit design objects of the display panel for reference size information of each the circuit design objects according to the size design information of the display panel;

determine size information of each of the circuit design objects according to the reference size information; and draw the shared design pattern of the plurality of GOA units according to the size information of each of the circuit design objects.

18. The device as claimed in claim 15, wherein the plurality of GOA units comprise two types of circuit structures, the plurality of GOA units comprise at least one first GOA unit and at least one second GOA unit, the circuit diagram information of the GOA unit comprises a first circuit diagram information corresponding to the first GOA unit and a second circuit diagram information corresponding to the second GOA unit, and the drawing module is specifically configured to:

draw a first shared design pattern of the first GOA unit according to the first circuit diagram information;

draw a second shared design pattern of the second GOA unit according to the second circuit diagram information;

fill the first shared design pattern into the available drawing space of each the first GOA unit to implement drawing a design pattern of the first GOA unit; and fill the second shared design pattern into the available drawing space of each the second GOA unit to implement drawing a design pattern of the second GOA unit.

19. The device as claimed in claim 15, wherein the drawing module is specifically configured to:

draw the clock driving patterns of a target number according to the size design information of the display panel;

align first-few GOA units of a target number among the plurality of GOA units with the clock driving patterns of the target number; and draw a virtual thin-film-transistor (TFT) and a virtual capacitor, and aligning the virtual TFT with a first-staged GOA unit of the plurality of GOA units and aligning the virtual capacitor with a last-staged GOA unit of the plurality of GOA units.

20. The device as claimed in claim 19, wherein the drawing module is specifically configured to:

searching a preset size database of the clock driving patterns of the display panel for reference size information of the clock driving patterns according to the size design information of the display panel;

determine size information of each of the clock driving patterns according to the reference size information of the clock driving patterns; and draw the clock driving patterns of the target number according to the size information of each of the clock driving patterns of the display panel.

* * * * *